Jan. 4, 1949.  E. CHALLET  2,458,251

SOLID ELECTRIC HEATING PLATE

Filed Oct. 28, 1937

Inventor:
E. Challet
By E. F. Wendroth
Atty

Patented Jan. 4, 1949

2,458,251

UNITED STATES PATENT OFFICE 2,458,251

SOLID ELECTRIC HEATING PLATE

Etienne Challet, Paris, France, assignor to Entreprises Electriques Fribourgeoises, Fribourg, Switzerland, a company of Switzerland Application October 28, 1937, Serial No. 171,576
In Switzerland January 13, 1937

Section 3, Public Law 690, August 8, 1946
Patent expires January 13, 1957

3 Claims. (Cl. 219—37)

The present invention relates to electrically heated plates.

If a solid plate of the same thickness throughout is heated uniformly it will first become red in a zone which is concentric to the periphery of the plate and which divides the plate surface into two zones of substantially equal area. Then as the heating is continued the red zone will spread towards the periphery and towards the center of the plate. However the first mentioned zone is generally the hottest. It is an object of the invention to provide means whereby the heating is uniform throughout the entire plate.

On the other hand if the heating of the plate is discontinued the plate will first cool at the periphery and at the center and the concentric central zone remains red even after the other parts of the plate have regained their normal appearance. It is an object of the invention to provide a plate wherein cooling will take place uniformly from the peripheries toward the central zone.

An object of the invention therefore is to provide an electrically heated plate wherein the stresses and strains due to heating are eliminated thereby considerably increasing the life of the plate.

A still further object of the invention is to provide an electrically heated plate wherein the thickness of the plate along the zone of greatest heat concentration is increased and such increased thickness takes place gradually from the periphery and the center of the plate to the above mentioned zone of greatest heat concentration.

A further object of the invention is to provide a solid electrically heated plate in which the thickness of the metal is proportioned to the quantity of heat transmitted by the heating unit at each point of the plate. In this way the surface portion of the plate subject to the greatest concentration of heat will be heated uniformly with the periphery and the center of the plate thereby eliminating any strain at the peripheral and central portions and also preventing warping.

With the above and other objects in view which will become apparent from the detailed description below the invention is shown in the drawings in which.

In the invention the electrically heated plate may be of round, annular, or of any other desired shape.

Figure 1:
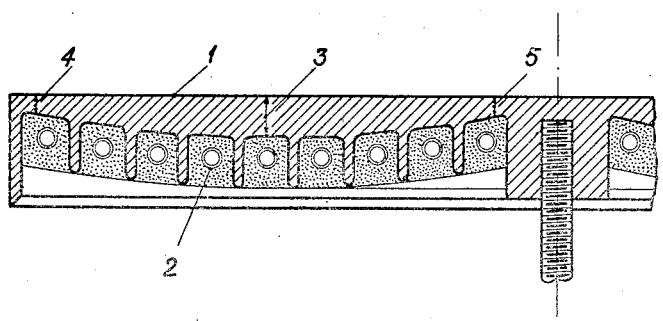
Fig. 1 is a partial cross-sectional view through one form of an electrically heated plate constructed in accordance with the invention.

Referring to the drawings wherein similar reference characters denote like parts in the various views Fig. 1 illustrates a partial sectional view of a solid round plate. The plate is indicated at 1 and the heating element 2 therefore is located as shown in a conventional insulating unit. As is clearly shown upon Fig. 1 the distance between the top of each insulating unit and the upper surface of the plate varies for each insulating unit. In the zone wherein there is the maximum concentration of heat this length is indicated by the distance line between the arrows 3. This length gradually decreases towards the periphery and towards the center where it reaches the length shown by the distance lines 4 and 5.

By constructing the thickness of the metal of the plate proportional to the quantity of heat transmitted by the resistance to the plate at each point a uniform heating of the entire plate may be obtained.

Figure 2:
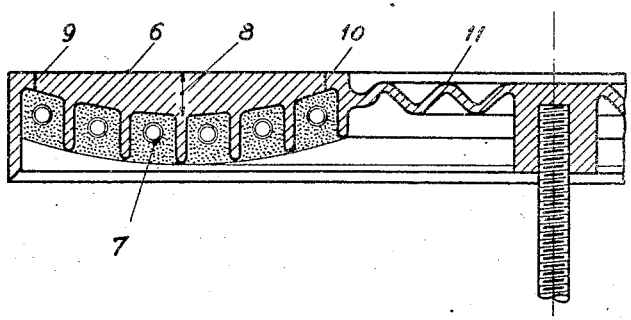
Fig 2 is a similar view of another type of electrically heated plate.

In Fig. 2 a modification is shown wherein 6 indicates the plate, 7 the heating element and the distances of the heating elements from the surface of the plate is shown by the distance lines 8, 9 and 10.

In this form of construction the central portion of the plate is provided with an undulating section integral with the plate. This construction at the central portion will yield to any contractions or expansions of the plate itself.

I claim:

1. An integral electrically heated plate comprising heating units and an integral metallic plate supporting said units, said plate having a thickness gradually increasing from the periphery inwardly and from the center outwardly towards a concentric zone intermediate said periphery and center so that a uniform heating throughout said plate may take place.

2. An integral electrically heated plate comprising heating units and an integral annular metallic plate supporting said units, said plate having a thickness gradually increasing from the periphery inwardly and from the center outwardly towards a concentric zone intermediate said periphery and center so that a uniform heating throughout said plate may take place.

3. An integral electrically heated plate comprising heating units and an integral metallic plate of disc shape supporting said units, said units being arranged annularly between a central portion of said plate and the periphery thereof, said plate having a thickness gradually increasing from the periphery thereof inwardly and from said central portion outwardly towards a concentric zone intermediate said periphery and central portion so that a uniform heating throughout said plate adjacent said heating units may take place and said plate having at said central portion an undulating configuration whereby any contraction or expansion of said plate may be compensated for without any stress or strain.

ETIENNE CHALLET.

REFERENCES CITED

The following references are of record in the file of this patent:

UNITED STATES PATENTS

| Number | Name | Date |
| --- | --- | --- |
| 1,485,153 | Wolcott | Feb. 26, 1924 |
| 1,492,540 | Kercher et al. | Apr. 29, 1924 |
| 1,579,732 | Owen | Apr. 6, 1926 |
| 1,729,673 | Kercher et al. | Oct. 1, 1929 |
| 1,998,764 | Jordan | Apr. 23, 1935 |
| 2,015,856 | Lang | Oct. 1, 1935 |